United States Patent
Khalid et al.

(10) Patent No.: US 9,482,236 B2
(45) Date of Patent: Nov. 1, 2016

(54) MODULATED COOLING FLOW SCHEDULING FOR BOTH SFC IMPROVEMENT AND STALL MARGIN INCREASE

(71) Applicant: Rolls-Royce Corporation, Indianapolis, IN (US)

(72) Inventors: Syed Jalaluddin Khalid, Palm Beach Gardens, FL (US); Mark J. Gritton, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 474 days.

(21) Appl. No.: 14/039,841

(22) Filed: Sep. 27, 2013

(65) Prior Publication Data

US 2014/0271113 A1     Sep. 18, 2014

Related U.S. Application Data

(60) Provisional application No. 61/780,873, filed on Mar. 13, 2013.

(51) Int. Cl.
*F04D 27/00* (2006.01)
*F04D 27/02* (2006.01)
*F02C 9/18* (2006.01)

(52) U.S. Cl.
CPC ............ *F04D 27/0246* (2013.01); *F02C 9/18* (2013.01); *F05D 2270/101* (2013.01); *Y02T 50/671* (2013.01)

(58) Field of Classification Search
CPC .......... F01D 25/12; F01D 25/24; F02C 9/18; F04D 27/0246; F05D 2270/101
See application file for complete search history.

(56) References Cited

U.S. PATENT DOCUMENTS

| 5,385,012 A | 1/1995 | Rowe |
| 5,857,321 A * | 1/1999 | Rajamani ................. F02C 9/28 60/39.24 |

(Continued)

FOREIGN PATENT DOCUMENTS

| EP | 0850831 A2 | 7/1998 |
| EP | 2096029 A2 | 9/2009 |
| GB | 2364748 A | 6/2002 |

OTHER PUBLICATIONS

International Search Report for PCT/US2013/066486, mailed Jan. 8, 2014.

*Primary Examiner* — Igor Kershteyn
(74) *Attorney, Agent, or Firm* — Fishman Stewart PLLC

(57) ABSTRACT

A turbine engine includes a compressor, and high and low pressure turbines. The configuration includes a mid-compression station which can be, in the case of a single compressor in the middle of that compressor, or at the exit of the first compressor in the case of two compressors. Also, there is an exit pressure station at the exit of the compression system. A first gas flow line is interposed between the mid-compression station of the compressor and the low pressure turbine, and a second gas flow line is interposed between the exit pressure station of the compression system and the high pressure turbine. A first valve is coupled to the first gas flow line and modulates a low pressure flow rate of coolant in the first gas flow line, and a second valve is coupled to the second gas flow line and modulates a high pressure flow rate of coolant in the second coolant flow line. A controller is configured to operate the first and second valves based on an operating condition of the turbine engine so as to improve the specific fuel consumption while ensuring acceptable stall margin.

17 Claims, 3 Drawing Sheets

(56) References Cited

U.S. PATENT DOCUMENTS

| | | |
|---|---|---|
| 6,141,951 A | 11/2000 | Krukoski et al. |
| 6,550,253 B2 | 4/2003 | Mortzheim et al. |
| 6,581,368 B2 * | 6/2003 | Utamura ............... F01K 21/047 60/39.3 |
| 6,796,129 B2 * | 9/2004 | Yee ........................ F23C 13/00 431/7 |
| 6,851,255 B2 | 2/2005 | Aitchison et al. |
| 6,921,244 B2 | 7/2005 | Johnson |
| 7,661,270 B2 | 2/2010 | Morimoto et al. |
| 7,870,743 B2 | 1/2011 | Lee et al. |
| 8,057,157 B2 | 11/2011 | Roush et al. |
| 8,240,153 B2 | 8/2012 | Childers et al. |
| 2001/0018824 A1 * | 9/2001 | Leone ..................... F01D 25/12 60/772 |
| 2007/0137213 A1 | 6/2007 | Rickert et al. |
| 2007/0151257 A1 * | 7/2007 | Maier ..................... F01D 5/189 60/782 |
| 2009/0113896 A1 * | 5/2009 | Fukuda ................... F02C 9/18 60/784 |
| 2010/0223903 A1 * | 9/2010 | Starr ..................... F01D 17/141 60/204 |
| 2010/0281879 A1 | 11/2010 | Shapiro et al. |
| 2010/0286889 A1 | 11/2010 | Childers |
| 2012/0060507 A1 | 3/2012 | King et al. |
| 2012/0117977 A1 | 5/2012 | Childers et al. |

* cited by examiner

MODULATED COOLING FLOW SCHEDULING FOR BOTH SFC IMPROVEMENT AND STALL MARGIN INCREASE

CROSS-REFERENCE TO RELATED APPLICATIONS

This application claims priority to U.S. Provisional Patent Application No. 61/780,873, filed Mar. 13, 2013, the contents of which are hereby incorporated in their entirety.

FIELD OF TECHNOLOGY

An improved method of operating a gas turbine is disclosed, and more particularly, an improved method of controlling coolant flow within the gas turbine to improve overall specific fuel consumption (SFC) while not compromising stall margin.

BACKGROUND

It has become increasingly desirable to reduce fuel consumption and improve overall SFC in a gas turbine. At the same time it is desirable to improve SFC without compromising on stall margin during all conditions of turbine engine operation.

Stall, or otherwise commonly known as surge, occurs when a compressor operating point/line rises to its stability limit that defines a limit between stable and unstable regions of flow. Below the limit, flow is stable, and a distance to the surge line, at a given flow rate, defines an amount of stall margin present at that given operating condition. The stability limit or surge line or stall line (depicted in FIG. 4 as 402) is the locus of the highest permissible stable pressure ratio ($PR_{stall}$) at a given compressor inlet corrected flow, Wc, below which compressor operation is stable.

Gas turbines are traditionally operated having turbine cooling flow requirements established to keep the turbine metal temperatures at acceptable levels. This cooling flow, originating from the compressor, also maintains the stall margin requirements. At high power and during engine acceleration (including hot re-slam or bodie) where the stall margin requirements are high a certain level of cooling airflow is required that provides adequate protection against stall, whereas at part power (e.g., cruise) the cooling airflow requirements can be reduced to improve SFC.

In traditional engines the coolant or airflow requirements are established based on high power operating conditions where the turbine inlet temperature is high. And, in traditional engines cooling airflow is typically not reduced at lower power, even when the turbine inlet temperature is relatively low. Thus, for part power operation (e.g., cruise), as an example, excess cooling is provided adversely impacting SFC.

SFC on the other hand could be improved by reducing cooling flow during cruise conditions where the turbine temperatures are not high. However, coolant airflow based on cruising requirements would compromise stall margin at high power operation and during engine acceleration (including hot re-slam or bodie) if the amount of coolant airflow is not increased to the level existing at high power.

Balancing the desire to enhance SFC while not jeopardizing stall margin has become an increasing challenge to the gas turbine industry. Overcoming these concerns would be desirable and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine and an exemplary control scheme for the gas turbine are described herein and are shown in the attached drawings. The gas turbine engine includes a compressor having a mid-compression pressure station and an exit pressure station, and low and high pressure turbines. Airflow lines and respective valves are interposed between the compressor and the turbine sections and controlled to operate based on an operating condition of the turbine engine.

Another exemplary illustration includes providing a method of operating a turbine engine and a computer readable storage medium having corresponding control instructions. The method includes modulating valves of the turbine engine based on an operating condition of the turbine engine, wherein the valves are coupled to respective coolant lines that are interposed between sections of a compressor and a turbine. Such an arrangement could eliminate the need for a separate low compressor bleed which is used in legacy engines to prevent low compressor stall during transient and certain off-design operating conditions. Thus there could be a reduction in cost and weight by harnessing the plumbing of the cooling flow system as explained in this application.

The operating condition typically includes but is not limited to cruise, acceleration, and bodie (hot re-slam), and coolant flow is controlled in order to achieve both SFC and stall margin benefits via judicious control of the flow controlling valves.

Figure 1:
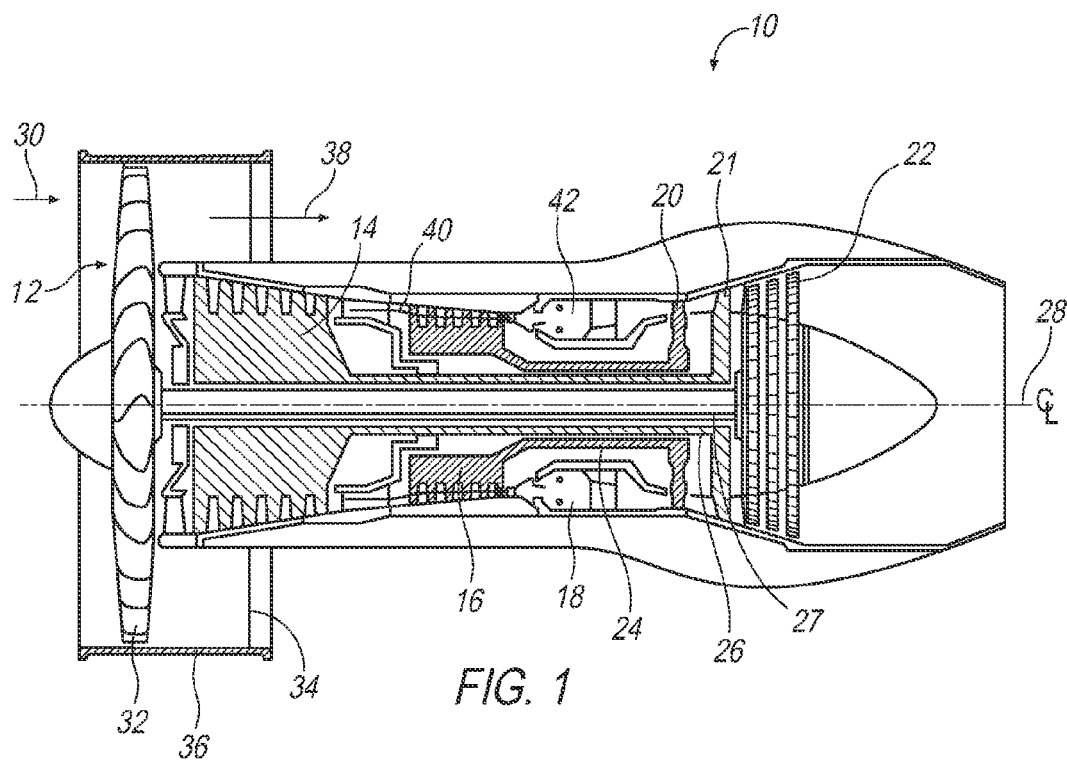
FIG. 1 is an illustration of a gas turbine engine employing the improvements discussed herein.

FIG. 1 illustrates a gas turbine engine 10, which includes a fan 12, a low pressure compressor and a high pressure compressor, 14 and 16, a combustor 18, and a high pressure, mid pressure and low pressure turbine, 20, 21 and 22, respectively. The high pressure compressor 16 is connected to a first rotor shaft 24 while the low pressure compressor 14 is connected to a second rotor shaft 26. The low pressure turbine 22 is connected to another shaft 27. The shafts extend axially and are parallel to a longitudinal center line axis 28. While FIG. 1 illustrates a three shaft engine, it will be appreciated that exemplary embodiments further contemplate two shaft and/or single shaft configurations.

Ambient air 30 enters the fan 12 and is directed across a fan rotor 32 in an annular duct 34, which in part is circumscribed by fan case 36. The bypass airflow 38 provides a large fraction of engine thrust while the primary gas stream 40 is directed to the combustor 18 and the turbines 20, 21, 22, and then exhausted through a nozzle generating thrust. The gas turbine engine 10 includes an improved combustor 18 having a bi-metal fastener assembly 42 for improved thermal growth compensation. It will be appreciated that the bi-metal fastener assembly 42 for improved thermal growth compensation could be used in other machinery and is not therefor limited to gas turbine engine environments.

Figure 2:
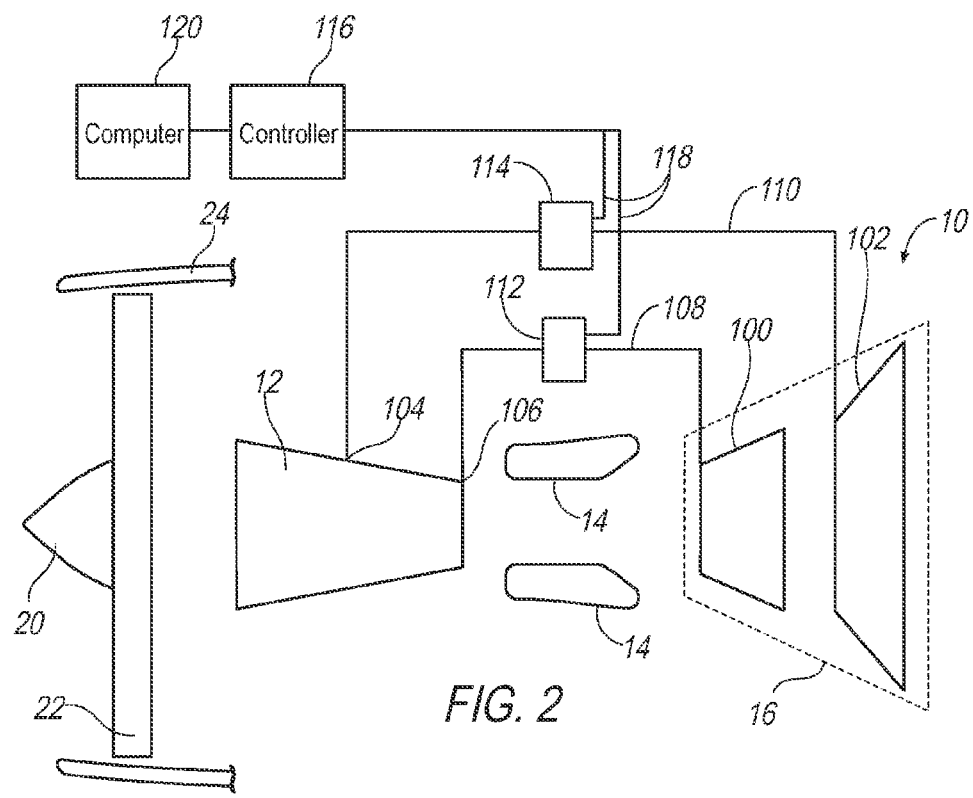
FIG. 2 illustrates a schematic diagram of cooling flow within the gas turbine machine of FIG. 1, having computer and control components.

FIG. 2 illustrates a schematic diagram of cooling flow within the gas turbine engine 10 of FIG. 1, and corresponding computer 120 and control 116 components. Turbine 20, 22 include high pressure turbine (HPT) 100 and low pressure turbine (LPT) 102. Compressors 14, 16 include an intermediate or mid-pressure compressor section 104 (IPC) and a high-pressure compressor (HPC) or exit pressure section 106. The mid-compression section 104 can also be at the exit of a low compressor driven by a separate shaft.

A first coolant flow line 108 is interposed between exit pressure section 106 of the compressor and HPT 100, and a second coolant flow line 110 is interposed between mid-pressure compressor section 104 and LPT 102. First and second airflow lines 108, 110 include respective valves 112, 114 that control a flow of air or, more generally, a gas-based coolant therein. Valves 112, 114 may be operated at a fully opened or full throttle position in which coolant flows generally uninhibited therethrough. Valves 112, 114 may also be operated in a partially opened or modulated position in which coolant flow is inhibited or restricted. In such fashion, valves 112, 114 may be controlled in a fashion in which coolant passing through respective lines 108, 110 may be modulated. Gas turbine engine 10 is controlled by a controller 116, which is coupled to valves 112, 114 via control lines 118. Computer 120 is coupled to controller 116 and the computer 120 includes a computer readable storage medium having stored thereon data representing instructions executable by the computer to control the turbine engine.

Valves 112, 114 are modulated to control cooling flow therethrough so that cooling flow may be reduced at, for instance, part power of gas turbine machine 10 in order to improve specific fuel consumption (SFC). In particular, when gas turbine machine 10 operates at part power (such as during cruise), if valves 112, 114 are at full throttle then coolant in excess of that needed passes from the compressor to the turbine assembly and excess margin against stall is achieved. However, such condition is at the expense of SFC. Thus, controller 116 operates or modulates (as instructed by computer 120) valves 112, 114 to partially close, causing a reduced flow to pass therethrough. Such reduced flow could be acceptable because gas temperatures at turbine assembly 16 themselves are not excessive when gas turbine engine 10 is operated at reduced or part power.

Typically, reduction in coolant flow has an adverse impact on stall margin due at least to: 1) reducing cooling flow and thereby reducing HPC bleed extraction (raising the HPC operating line), and 2) reduced mid-compressor bleed extraction for LPT cooling can stall front stages in the compressor, which are stability limiting at low power thus lowering the stall line.

A decrease in cooling flow raises the operating line because of engine re-matching, causing a loss in stall margin. A turbine flow parameter is indicative of turbine flow capacity and is constant when turbine nozzle throats are choked (i.e., when the Mach number through the throats is unity) and is the maximum value that can be reached in the throats. The maximum value generally exists throughout the operating range from idle to maximum power. The turbine flow parameter is defined as $W4*sqrt(T4)/P4$=constant, wherein W4 refers to gas flow through the vanes, P4 refers to the gas total pressure, and T4 refers to the gas total temperature. With cooling flow decrease, W4 increases and hence $sqrt(T4)/P4$ decreases by the same percentage to keep the flow parameter constant. Because both T4 and P4 increase, the percentage increase in P4 is more than the percentage decrease in cooling flow. Additionally, with reduced cooling flow the corresponding compressor speed (i.e., corrected flow Wc) is decreased as well (since with decreased cooling flow the desired thrust is achieved with reduced Wc). As such, compressor pressure ratio (CPR) increases and Wc decreases at constant thrust with decreasing cooling flow resulting.

Figure 3:
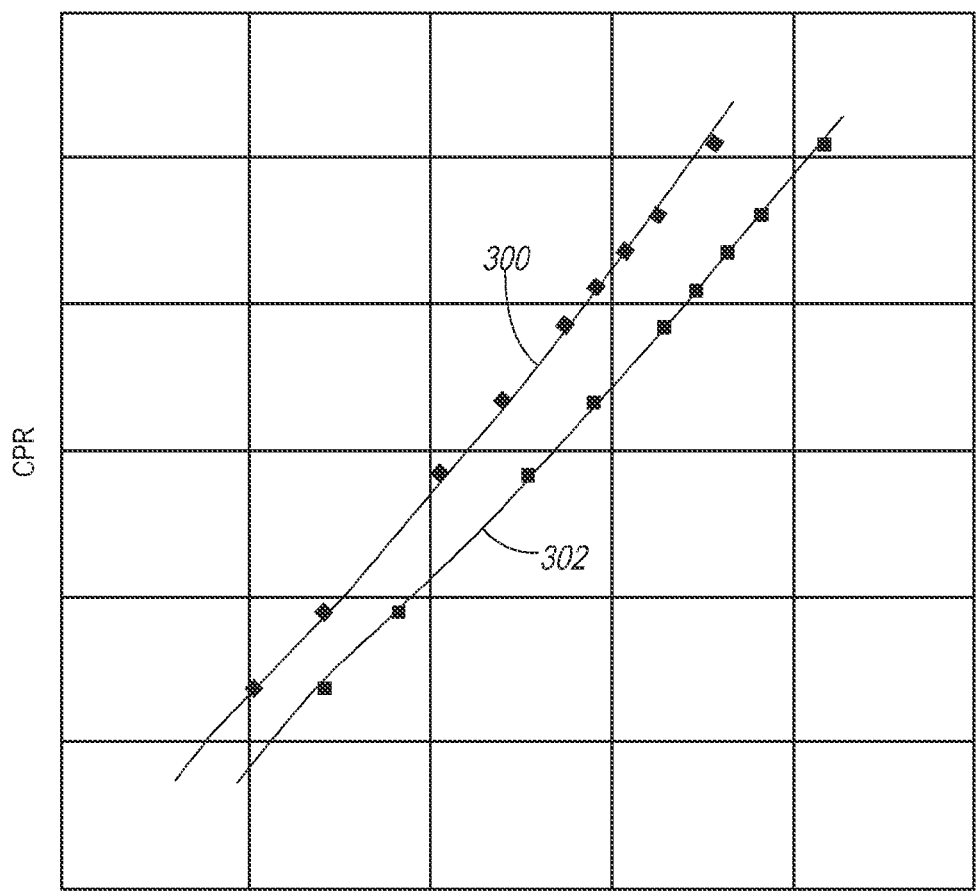
FIG. 3 illustrates a graph, showing an exemplary shift in operating line as a function of a change in cooling flow.

FIG. 3 illustrates an exemplary shift in the HPC operating line as a function of a change in cooling flow, illustrated by CPR as a function of corrected flow. As shown therein, operating line 300 illustrates a base HPT cooling flow as a result of a flow modulation or restriction, and a shift to operating line 302 occurs for an increase in flow. That is, for increased coolant flow the operating line is lowered increasing stall margin–the % increase being more than the % increase in cooling flow (i.e., shifts down and right). For high performance engines, compressor exit cooling bleed can be in excess of 20% of total compressor airflow. Modulation has a typical lower limit of 75% of maximum cooling flow (i.e., full throttle operation of valves 112, 114) so as to provide adequate backflow margin to prevent hot gas ingestion into the secondary flow system. And, when the lower limit of 75% is adhered to in a known modulating flow scheme, not reducing cooling flow during for instance an acceleration or a bodie, means stall margin decrease as illustrated in FIG. 3. In one example, a 5% bleed decrease corresponds to a 10% margin decrease, corresponding in this example to an approximate 1:2 ratio of bleed to margin decrease. That is, in this example, in the range of rates of bleed typically experienced, for each 1% reduced bleed, approximately 2% of loss of stall margin was experienced.

Figure 4:
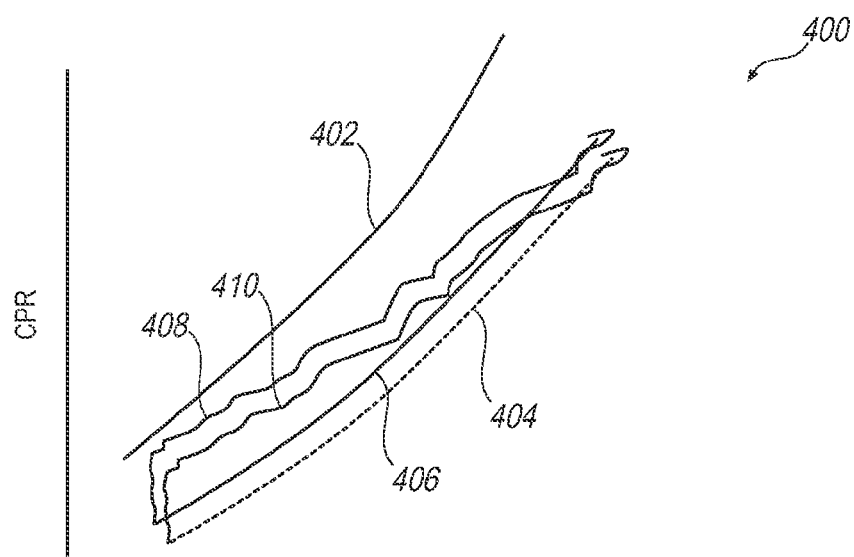
FIG. 4 illustrates a graph, showing stall margin benefit without cooling flow reduction.

FIG. 4 illustrates a plot 400 that includes a surge or stall line 402 above which unstable operation of the compressor can occur. One skilled in the art will recognize that the location and shape of stall line 402, although specifically represented in plot 400 as stall line 402, may not necessarily be so readily or definitively defined. That is, stall line 402 represents a hypothetical curve above which instability occurs in the compressor, but the location of stall line 402 is dependent on many factors that include but are not limited to the compressor design, compressor age, conditions of operation (ambient air conditions, aircraft speed, etc. . . . ), and recent transient operation, to name a few. As such, it is desirable to maintain a safety margin from stall line 402 in order to ensure stable operation of the compressor. That is, it is desirable to operate with sufficient margin below stall line 402 such that the possibility of stall or surge is avoided under all conditions. In order to do so and as stated above, stall margin may be maximized by maintaining full open throttle of valves 112 and 114 as shown in FIG. 2. However, as also stated, such operation comes with the cost of increased SFC (increased SFC means higher fuel consumption)

As such, when operating in conditions that have an inherently high stall margin, it may be desirable to reduce the amount of bleed from the compressor (mid or exit) to respective low and high pressure turbines in order to reduce fuel consumption and improve SFC. FIG. 4 illustrates exemplary transient and steady-state operating conditions of a compressor, with and without full throttle of the cooling flow bleed valves. For instance, curves 404 and 406 represent steady-state operation that may include, for instance a cruising operation of an aircraft. Curve 404 illustrates steady-state operation with full bleed, or full throttle operation of both valves 112 and 114. As seen therein, curve 404 is sufficiently offset from stall line 402 and one or both valves 112, 114 may be operated with reduced bleed in order to improve SFC. That is, consistent with the trend illustrated in FIG. 3, by reducing the bleed, curve 406 therefore represents a steady-state operating condition that is moved closer to stall line 402 over the range of corrected flow Wc, but without consuming the stall margin to an unacceptably low level.

Curves 408 and 410 of FIG. 4 illustrate a transient or dynamic operation of a compressor. The transient operation may be a quick acceleration or a bodie (hot re-slam), for instance. A bodie, as commonly known in the art, refers to as one example a condition in-flight when the engine power is suddenly increased following quick deceleration. Curve 408 represents transient operation under a reduced bleed condition and during the transient operation. As known in the art, engine power can change rapidly. Thus a sudden acceleration that occurs when operating in a more energy-efficient cruising bleed mode can result in a rapid shift in the operating curve from curve 406 to curve 408. Thus, under these dynamic conditions and in this example, compressor operation moves rapidly toward the stall line and it is thus desirable to correspondingly increase the bleed (cooling flow) in order to gain back stall margin. As such and more generally, under certain conditions it is desirable to modulate first valve 112 and second valve 114 based on an operating condition of the turbine engine. Two general scenarios are outlined in FIGS. 5 and 6 below.

Figure 5:
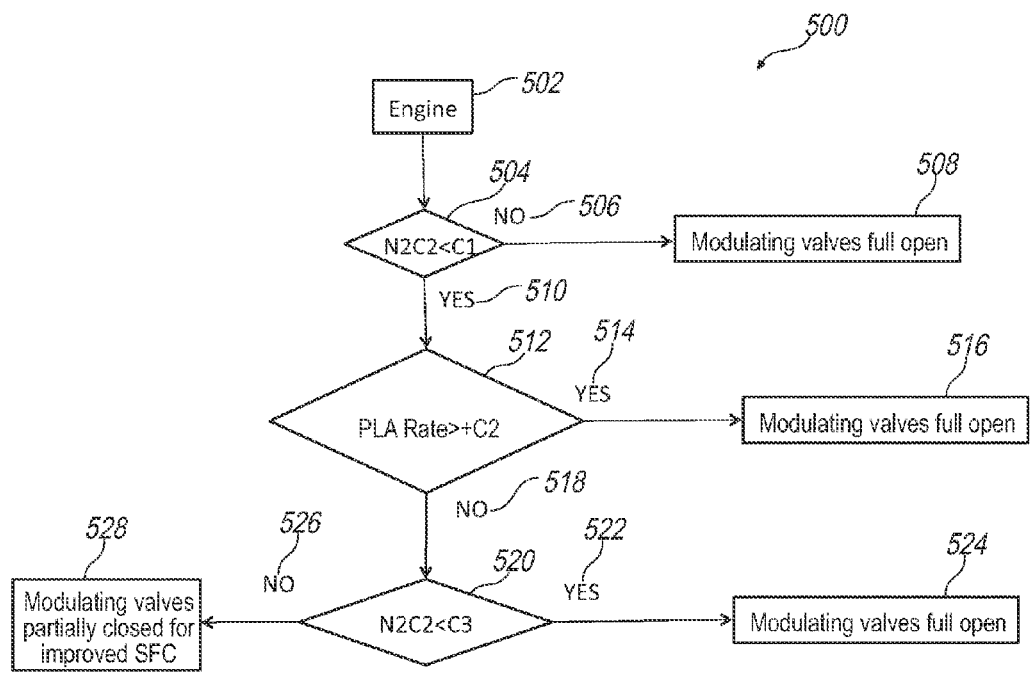
FIG. 5 illustrates a diagram, showing cooling flow modulation logic implementable to ensure SFC enhancement as well as stable engine operation for all scenarios.

FIG. 5 represents an algorithm 500 of generally steady-state operation of a turbine engine, such as turbine engine 10 illustrated above and illustrated as block 502. The generally steady-state operation is operation without generally destabilizing events occurring. Thus, algorithm 500 may be used to determine whether conditions are right for valves such as valves 112, 114 to be modulated and reduce the bleed to the turbines as illustrated in order to improve SFC. Algorithm 500 may be implemented by a computer such as computer 120 of FIG. 2, which may then control operation of gas turbine engine 10 via controller 116. Algorithm 500 includes a term N2C2 commonly known in the art as the corrected speed of the engine. Algorithm 500 also includes the term PLA that is a commonly known term in the art referring to Power Level Angle, which is a reference to a power level of the turbine engine that is requested by a pilot of the aircraft, corresponding to a power request to the turbine engine.

Although not representative of fully steady-state conditions, as stated FIG. 5 represents generally non-destabilizing operation that an aircraft may experience during normal operation. Under such normal operating conditions it may be desirable to operate having valves 112, 114 (described above) in fully open condition but, if operating conditions are right as defined by algorithm 500, then bleed may be reduced from the compressor in order to improve SFC. Block 504 illustrates a first decision of algorithm 500 in which corrected engine speed N2C2 is compared to a predetermined threshold value C1. C1 represents a compressor corrected speed that may be ascertained particular to a given compressor in which, for the given design, age of the compressor, etc., it is assumed that stall may occur if N2C2 is above. That is, if N2C2 is not below C1 506, then modulating valves 112, 114 are full open 508 to maintain maximum stall margin.

However, if N2C2 is below C1 510, then algorithm 500 determines at a second decision 512 whether a PLA rate is greater than a given value C1. C2 is a value in units of degrees/second above which stall margin may be reduced, that is particular to engine type, engine age, aircraft type, and the like. If the PLA rate is greater than C2 514, then stall margin may be reduced and modulating valves 112, 114 are full open 516 to maintain a maximum stall margin.

If the PLA rate is not greater than C2 518, then N2C2 is used to determine if very low speed operation is occurring, in which N2C2 is less than a given threshold at third decision 520. For very low corrected speed N2C2 stall margin may be challenged as well. Thus, if N2C2 is less than the given threshold 522, then modulating valves 112, 114 are full open 524 to maintain a maximum stall margin. If N2C2 is not less than threshold C3 (i.e., not at very low corrected speed) 526, then modulating valves 112, 114 are partially closed for improved SFC 528.

Thus, in summary FIG. 5 illustrates a control algorithm 500 in which generally steady state conditions are assessed to determine if a generally standard condition of operation is being experienced. If corrected speed N2C2 is within operating bounds of C1 and C3, and if the PLA rate is not excessive and above C2, then generally normal (i.e., cruise) operation is experienced and valves 112, 114 are modulated to partially closed position, and SFC is improved. However, the steady-state conditions are continuously monitored and if any of the conditions in algorithm 500 changes to fall outside of the corresponding threshold value, then valves 112, 114 are modulated to full bleed to avoid approaching a stall condition.

Figure 6:
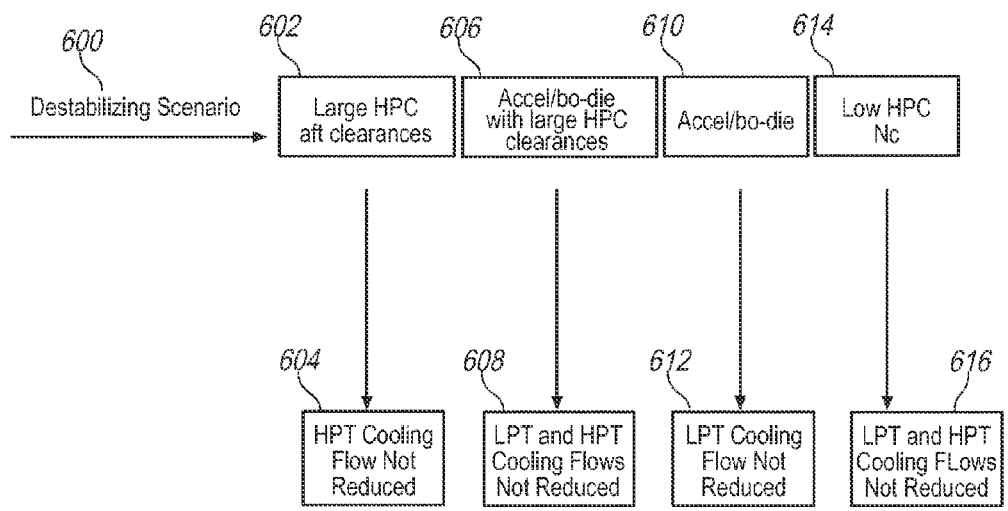
FIG. 6 illustrates a diagram, showing exemplary destabilizing scenarios and corresponding reduction of current flows via cooling flow bleed valves.

FIG. 6 represents a number of exemplary dynamic destabilizing scenarios 600 that are also monitored by computer 120 in order to determine, in addition to that of algorithm 500, whether flow should not be reduced via valves 112, 114. A first scenario 602 includes an assessment of whether large HPC aft clearances exist. That is, as commonly known in the art, dynamic or transient conditions may arise in which large HPC aft clearances are experienced, causing a loss in stall margin. If such is experienced, then HPT cooling flow is not reduced, but cooling to LPT is or remains reduced 604. Thus, in this condition and referring back to FIG. 2, valve 112 to HPT 100 is at full throttle while valve 114 to LPT is at partial throttle. In such fashion, stall margin is maintained while the bleed is reduced from the LPC, resulting in a partial improvement of SFC against a condition of full bleed in both valves 112, 114.

A second exemplary dynamic or destabilizing scenario 606 occurs when the large HPC clearances as described for scenario 602 are experienced in conjunction with an acceleration or bodie. Under such conditions both valves 112, 114 are throttled or modulated to full open 608 and flows from respective compressor locations are not reduced. In such fashion, both LPT and HPT cooling flows occur at full throttle of valves 112, 114 in order to avoid loss of stall margin.

A third exemplary dynamic or destabilizing scenario 610 occurs in which an acceleration or a bodie occurs. However, in contrast to scenario 606, large HPC clearances are not experienced in this scenario and thus HPT cooling is reduced to partial throttle via valve 112, but valve 114 is maintained at full throttle to LPC 612. In such fashion, stall margin is maintained while the bleed is reduced from the HPC, resulting in a partial improvement of SFC against a condition of full bleed in both valves 112, 114.

A fourth exemplary dynamic or destabilizing scenario 614 occurs in which a low HPC Nc is experienced. Nc is a corrected compressor speed which can correspond to either N2C2 or N2C25, as commonly understood. When Nc drops below a given threshold then both bleeds are not reduced 616 because there is typically low stall margin at the low end of Nc. Thus, under this condition both valves 112, 114 are at full throttle and flows and LPT and HPT cooling flows are not reduced. It will be appreciated that other scenarios may be employed.

According to one example, valve 114 may be fully opened based on an operating condition where the compressor is subjected to inlet total pressure distortion (non-uniformity of flow) or total temperature distortion (non-uniformity of inlet airflow total temperature).

A method is disclosed that reduces low and high pressure turbine cooling flow during cruise (altitude condition) and other part power conditions where turbine temperatures are not excessive, to improve cruise SFC for reduced fuel burn. Two modulating valves are disclosed that control compressor exit cooling flow for the HPT, and mid-point compressor bleed for the LPT. Reduction of compressor bleeds impacts compressor stall margin and, as such, control of the modulating valves is judicious in that flow reduction is implemented when sufficient stall margin is present, resulting in overall SFC reduction.

In general, computing systems 120 and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices 120 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A turbine engine comprising:
   a compressor having a mid-compression station and an exit pressure station;
   a low pressure turbine and a high pressure turbine;

a first gas flow line interposed between the exit pressure station of the compressor and the high pressure turbine;

a second gas flow line interposed between the mid compression station of the compressor and the low pressure turbine;

a first valve coupled to the first gas flow line and configured to modulate a first flow rate of coolant in the first gas flow line;

a second valve coupled to the second gas flow line and configured to modulate a second flow rate of coolant in a second coolant flow line;

a controller configured to operate the first and second valves based on an operating condition of the turbine engine; and a computer programmed to instruct the controller to modulate the first and second valves based on the operating condition, wherein the computer is programmed to instruct the controller to modulate the second valve to a full open position based on the operating condition that comprises one of an acceleration and a bodie.

2. The turbine engine as claimed in claim 1, wherein the computer is programmed to instruct the controller to modulate the first and second valves to full open positions based on the operating condition that comprises at least one of:
   a) comparing a corrected speed of the compressor to a first given threshold (C1) above which speed the compressor is destabilized;
   b) comparing a power level angle rate to a second given threshold (C2) above which speed of the compressor can be destabilized; and
   c) comparing the corrected speed to a third given threshold (C3) below which speed the compressor can be destabilized.

3. The turbine engine as claimed in claim 2, wherein the computer is programmed to instruct the controller to modulate the first and second valves both to a partially closed position if all three of operating conditions a), b), and c) do not indicate that the compressor is destabilized.

4. The turbine engine as claimed in claim 1, wherein the computer is programmed to instruct the controller to modulate the first valve to a full open position based on the operating condition that comprises determining a presence of large high pressure compressor aft clearances.

5. The turbine engine as claimed in claim 1, wherein the computer is programmed to instruct the controller to modulate the first and second valves to full open positions based on the operating condition that comprises one of an acceleration and a bodie, and further comprises determining a presence of large high pressure compressor aft clearances.

6. The turbine engine as claimed in claim 1, wherein the computer is programmed to instruct the controller to modulate the first and second valves to full open positions based on the operating condition that comprises determining whether a corrected compressor speed of a high pressure compressor is below a given threshold thereof.

7. A method of operating a turbine engine comprising:
modulating first and second valves of the turbine engine based on an operating condition of the turbine engine, wherein:
   the first valve is coupled to a first coolant line that is interposed between an exit pressure station of a compressor and a high pressure turbine, and the first valve is configured to control a first coolant rate in the first coolant line; and
   the second valve is coupled to a second coolant line and is interposed between a mid-compression pressure station of the compressor and a low pressure turbine, and the second valve is configured to control a second coolant rate in the second coolant line;

the method further comprising:
determining a stall margin based on the operating condition of the turbine engine; and
operating the first and second valves based on the determination.

8. The method as claimed in claim 7, further comprising:
determining the operating condition as one of:
   a) comparing a speed of a compressor of the turbine engine to a first given threshold above which speed the compressor can be destabilized;
   b) comparing a power level angle rate to a second given threshold above which speed the compressor can be destabilized;
   c) comparing the compressor speed to a third given threshold below which speed the compressor can be destabilized; and
   modulating both the first and second valves to a full open condition if one of steps a), b), and c) indicates that the compressor can be destabilized.

9. The method as claimed in claim 8, further comprising:
modulating both the first and second valves to respective partially closed positions if all three operating conditions of a), b), and c) do not indicate that the compressor can be destabilized.

10. The method as claimed in claim 7, comprising modulating the first valve to a full open position based on the operating condition that comprises determining a presence of large high pressure compressor aft clearances.

11. The method as claimed in claim 7, comprising modulating the first and second valves to full open positions based on the operating condition that comprises one of an acceleration and a bodie, and further comprises determining a presence of large high pressure compressor aft clearances.

12. The method as claimed in claim 7, comprising modulating the second valve to a full open position based on the operating condition that comprises one of an acceleration and a bodie.

13. The method as claimed in claim 7, comprising modulating the second valve to a full open position based on the operating condition where the compressor is subjected to inlet total pressure distortion.

14. The method as claimed in claim 7, comprising modulating the first and second valves to full open positions based on the operating condition that comprises determining whether a corrected compressor speed is below a given threshold thereof.

15. A non-transitory computer-readable medium tangibly embodying computer-executable instructions comprising:
instructions for modulating a rate of coolant flow between a compressor and a turbine within a gas turbine engine, via first and second valves, based on an operating condition of the turbine engine, wherein:
   the first valve is within a first coolant flow line that is configured to flow coolant between an exit section of a compressor and a high pressure turbine, and the first valve is configured to control a first coolant flow rate in the first coolant flow line; and
   the second valve is within a second coolant flow line that is configured to flow coolant between a mid-pressure section of the compressor and a low pressure turbine, and the second valve is configured to control a second coolant flow rate in the second coolant flow line;

wherein the instructions further comprise steps to determine the operating condition based on at least one of:
a) a comparison of a compressor speed of the compressor to a first given threshold above which speed the compressor can be destabilized;
b) a comparison of a power level angle rate to a second given threshold above which speed the compressor can be destabilized; and
c) a comparison of the compressor speed to a third given threshold below which speed the compressor can be destabilized; and the instructions further comprise modulating both of the first and second valves to full open conditions if one of the determined operating conditions indicates that the compressor can be destabilized.

16. The computer-readable medium as claimed in claim 15, wherein the instructions further include modulating the first and second valves both to a partially closed position if all three of operating conditions a), b), and c) do not indicate that the compressor can be destabilized.

17. The computer-readable medium as claimed in claim 15, wherein the instructions further comprise steps to modulate one of the following:
the first valve to a full open position based on the operating condition that comprises determining a presence of large high pressure compressor aft clearances;
the first and second valves to full open position based on the operating condition that comprises one of an acceleration and a bodie and also a determination of a presence of large high pressure compressor aft clearances;
the second valve to a partial open position based on the operating condition that comprises one of an acceleration and a bodie; and
the first and second valves to full open positions based on the operating condition that comprises determining whether a corrected compressor speed is below a given threshold thereof.

* * * * *